United States Patent [19]

Williams, Jr. et al.

[11] 3,899,915

[45] Aug. 19, 1975

[54] CONVEYOR SCALE CALIBRATION

[75] Inventors: Roger B. Williams, Jr., Sylvania, Ohio; Richard C. Loshbough, Temperance, Mich.; Richard A. Cherry, Toledo, Ohio

[73] Assignee: Reliance Electric Company, Toledo, Ohio

[22] Filed: Nov. 7, 1973

[21] Appl. No.: 413,657

[52] U.S. Cl. .................... 73/1 R; 177/50; 177/245
[51] Int. Cl.² ................ G01G 11/00; G01G 23/00
[58] Field of Search ............ 73/1 R, 1 B, 2; 177/50, 177/245

[56] References Cited
UNITED STATES PATENTS

| | | | |
|---|---|---|---|
| 2,715,717 | 8/1955 | Keithley et al. | 73/1 R |
| 2,887,654 | 5/1959 | Strassman et al. | 73/1 R |
| 3,439,524 | 4/1969 | Rogers | 73/1 B |
| 3,656,337 | 4/1972 | McDonald | 73/1 B |

*Primary Examiner*—S. Clement Swisher

[57] ABSTRACT

Apparatus and a method for calibrating a conveyor scale which measures at least the rate at which material is carried through a region by a conveyor. The scale is of a type which generates a first electric signal corresponding to the speed of the conveyor, a second electric signal corresponding to the material weight within the region and from these signals generates a third signal corresponding to the material transfer rate. During calibration of the conveyor scale, an electric signal is generated to correspond to a simulated conveyor speed. The simulated speed signal is used in combination with a predetermined weight signal for obtaining a transfer rate signal. The weight signal is generated either by placing the predetermined weight on the stopped conveyor or by an electric signal generator which simulates the predetermined weight. The conveyor scale is then calibrated such that the indicated transfer rate corresponds to an actual transfer rate determined from the simulated conveyor speed and the predetermined material weight. The apparatus and method also may be used to calibrate a conveyor scale which measures the total weight of material transferred over a period of time.

13 Claims, 1 Drawing Figure

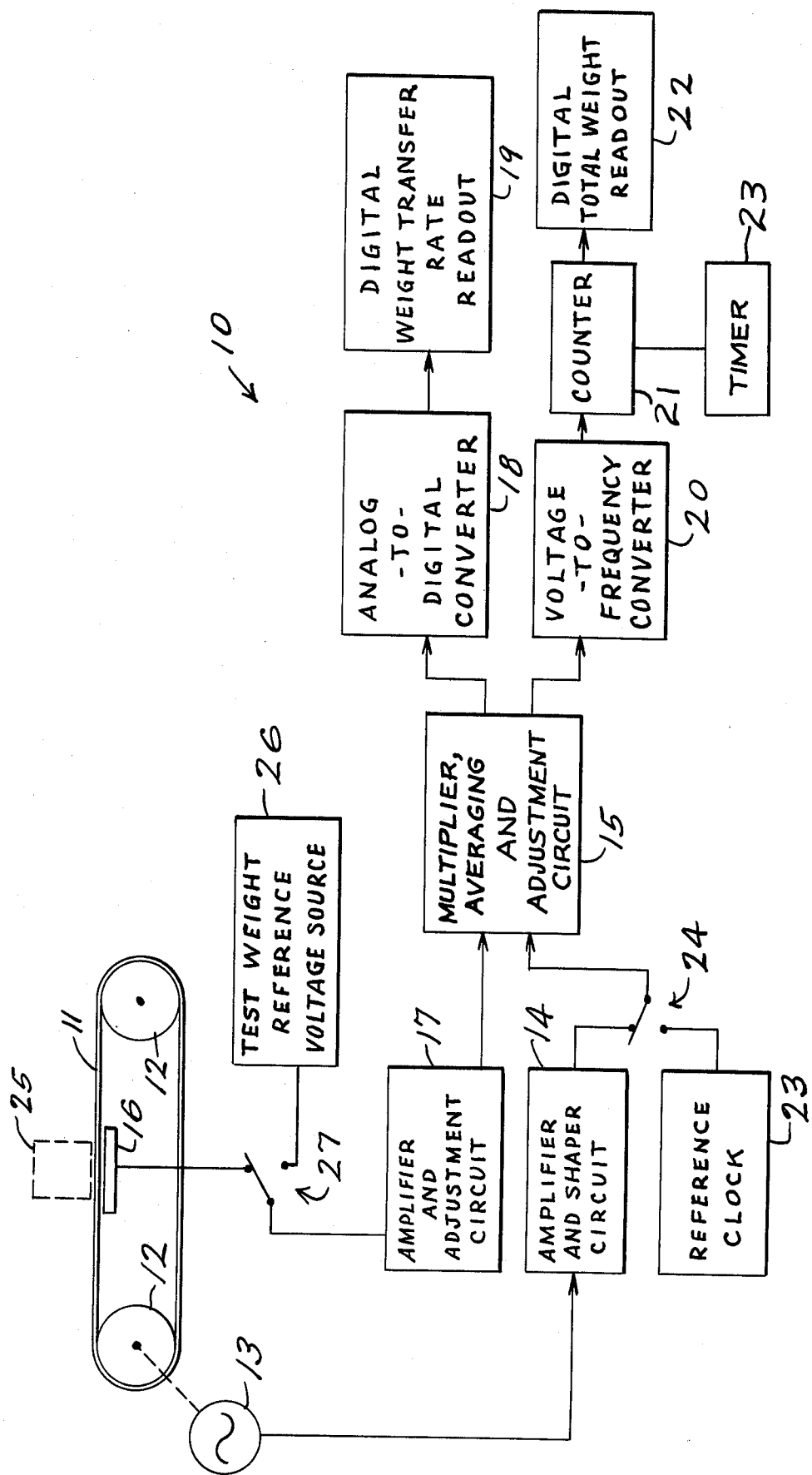

CONVEYOR SCALE CALIBRATION

BACKGROUND OF THE INVENTION

This invention relates generally to measuring apparatus and more particularly to an improved apparatus and method for calibrating a conveyor scale which measures either the rate or weight of material conveyed through a region.

Conveyor scales are commonly used in bulk material handling. It is often desirable to measure the total quantity of bulk materials delivered or transferred over a period of time and to measure the instantaneous rate at which material is being transferred. Bulk materials are often transferred, for example, from a supply hopper into a batch hopper by means of either a belt conveyor or a screw or auger conveyor. When batch ingredients are compounded within a batch hopper according to a formula, a measure of the total weight of each ingredient delivered into the hopper is quite important to maintain the compounded batch within tolerance limits for the formula.. Such measurements may be made by conveyor scales.

It is well known that the product of the speed at which material is delivered through a region times the weight of material within the region will equal the instantaneous transfer rate through the region. For example, if 5 pounds of material are present on one lineal foot segment of a belt conveyor moving at 10 feet per minute, the instantaneous transfer rate for this segment of the conveyor is 50 pounds per minute. If this transfer rate is shown as a curve on a graph with respect to time, it will be appreciated that the area under the curve over a time interval, or the integral of the curve for such time interval, will equal the total weight of material delivered during the time interval.

In the past, both mechanical and electrical integrating conveyor scales have been constructed for measuring both the transfer rate and the total quantity of a material transferred or conveyed over a period of time. These scales have met with varying degrees of success. In many instances, the scales have had a very limited accuracy. One cause for scale inaccuracies has resulted from the difficulty in calibrating conveyor scales in the field. Electronic conveyor scales in general are capable of producing more accurate measurements than mechanical conveyor scales. However, temperature changes, voltage changes, component aging and various other factors may eventually cause a drift or change in the accuracy of an electronic scale over a period of time.

The typical prior art method for calibrating a conveyor scale requires conveying an accurately known weight of material over a measured time interval. This may be accomplished by either pre-weighing the material before the calibration run or by collecting the material into a hopper, truck, rail car or similar device and weighing it after the run. In either event, the calibration is subject to error due to loss of material in transit to and from the remote scale, by gain or loss in weight caused by changes in the moisture content of the material and by other factors such as human errors. Furthermore, for any degree of accuracy, this method requires a relatively large amount of test material since many large capacity conveyor scales indicate only in tons or tenths of tons, and at least 1,000 increments of weight are required to provide sufficient resolution to avoid errors. In any event, the prior art methods for calibrating conveyor scales have been expensive and time consuming. This is also due to the fact that several test runs were required to calibrate a conveyor scale. The scale is readjusted after each test run until a desired degree of accuracy is achieved. In many instances, as much as 8 hours or more has been required to field calibrate a conveyor scale.

SUMMARY OF THE INVENTION

According to the present invention, an improved apparatus and method is provided for calibrating electronic conveyor scales of the type which include means for generating a signal corresponding to the conveyor speed and means for generating a second signal corresponding to the material weight on a segment of the conveyor. Calibration of the conveyor scale is accomplished by the use of a reference clock which generates a signal corresponding to a predetermined conveyor speed. The conveyor may then be stopped during calibration. A signal corresponding to a predetermined reference weight is also generated for calibrating the scale. This may be accomplished either by placing a reference weight on the stopped conveyor for measurement by the existing scale circuitry or by the use of a separate signal generator which generates an electric signal corresponding to the reference weight. A simulated transfer rate may be readily calculated from the known reference weight and the simulated conveyor speed. The conveyor scale is then calibrated to indicate the simulated transfer rate. When the conveyor scale is of a type which indicates total weight transferred over a period of time either in addition to or in place of the transfer rate, the calibration signals may be applied to the scale for a measured time interval. The total simulated transfer weight may then be readily calculated and used to correct the indicated weight. After the scale is test calibrated, an actual measurement is made with a known quantity of "live" material. In the event of an error in the indicated transfer rate or total transferred weight, a calibration factor is established from the percentage error. Again generating a constant simulated transfer rate and the calibration factor, a percentage change may be easily made in the indicated transfer rate to complete calibration of the scale.

Accordingly, it is a preferred object of the present invention to provide an improved method and apparatus for calibrating conveyor scales.

Another object of the invention is to provide an improved method and apparatus for calibrating a conveyor scale which does not require repeated conveying of large quantities of accurately weighed material.

Other objects and advantages of the invention will become apparent from the following detailed description, with reference being made to the accompanying drawing.

BRIEF DESCRIPTION OF THE DRAWING

The single FIGURE is a block diagram of a conveyor scale including apparatus for scale calibration according to the method of the present invention.

DESCRIPTION OF THE PREFERRED EMBODIMENTS

Referring now to the single drawing, a block diagram is shown for a conveyor scale 10 including calibration devices for practicing the method of the present invention. Details of a typical conveyor scale in which the present invention may be incorporated are shown in U.S. Pat. No. 3,754,126 which issued to Roger B. Williams, Jr. on Aug. 21, 1973 and the material described in such patent is incorporated herein. However, it is not intended to limit the present invention to use solely with the conveyor scale described within U.S. Pat. No. 3,754,126. The present invention is suitable for use with any electronic conveyor scale which generates a first signal corresponding to the speed of the conveyor, a second signal corresponding to the weight of material on a segment or region of the conveyor and uses these signals for determining the weight transfer rate and/or the total weight of material transferred over a period of time.

The conveyor scale 10 is shown connected to an endless conveyor belt 11 which moves over sprockets or drums 12, at least one of which is driven. One of the sprockets 12 is connected to a tachometer 13 which generates a signal having a frequency proportional to the speed of the conveyor belt 11. The output from the tachometer 13 is applied to an amplifier and shaper circuit 14. The output from the amplifier and shaper circuit, which may, for example, consist of a pulse stream in which each pulse is of a uniform width and has a spacing dependent upon the frequency of the output from the tachometer 13, is applied to a multiplier, averaging and adjustment circuit 15.

A scale 16 is positioned under one segment or region of the conveyor belt 11 for measuring the instantaneous weight of material on the conveyor belt 11 within the region over the scale 16. Suitable transducer means, such as a load cell, is included in the scale 16 for generating an electric signal corresponding to the weight on the segment of the scale 16. This transducer is connected to an amplifier and adjustment circuit 17 which generates an analog signal proportional to the weight of material on the scale 16. The amplifier 17 preferably includes circuitry which compensates for the tare weight on the scale 16 including the weight of the segment of the belt 11 which passes over the scale 16. The output from the amplifier 17 is also normally connected to the multiplier and averaging circuit 15.

The multiplier, averaging and adjustment circuit 15 generates an analog signal proportional to the weight transfer rate which is in effect the product of the speed of the conveyor belt 11 times the net weight of material in the region above the scale 16. This may be accomplished, for example, by using the analog weight signal from the amplifier 17 to modulate the conveyor speed pulse signal from the tachometer 13 and amplifier 14 and filtering this product to obtain a continuous analog rate signal. The analog rate signal may be displayed on a meter or it may be converted to a digital signal by a conventional analog-to-digital converter 18 and displayed on a digital weight transfer rate readout 19. The analog rate signal may also be applied to a voltage-to-frequency converter 20 for generating a pulse train having a frequency proportional to the instantaneous transfer rate. The pulses from the converter 20 are then counted by a counter 21 and applied to a digital readout 22 which indicates the total weight transferred over a period of time. The voltage-to-frequency converter 20 and the counter 21 function as an integrator which, in effect, measures the area under a time curve formed by the analog transfer rate signal from the multiplier, averaging and adjustment circuit 15. With the exception of the analog-to-digital converter 18 and the digital rate readout 19, details of the above-described conveyor scale are provided in the Williams U.S. Pat. No. 3,754,126. In the scale described in the Williams patent, the transfer rate was shown by means of a transfer rate meter rather than a digital rate readout.

In accordance with the present invention, the conveyor scale 10 is first test calibrated by using apparatus which simulates motion of the conveyor belt 11 while the conveyor belt 11 is actually motionless. This is accomplished by means of a reference clock 23 and a switch 24 for connecting the reference clock 23 to the multiplier and averaging circuit 15 in place of the tachometer signal from the amplifier and shaper circuit 14. The reference clock 23 generates a constant frequency clock pulse train which corresponds to the output of the amplifier and shaper circuit 14 when the conveyor belt 11 is moving at a predetermined constant speed.

A reference weight signal is also supplied to the multiplier, averaging and adjustment circuit 15 during calibration. This is preferably supplied in one of two manners. In a first embodiment, the reference weight signal may be supplied to the multiplier, averaging and adjustment circuit 15 merely by placing the reference weight shown in dashed lines at 25 on the stopped conveyor belt 11 over the scale 16. The amplifier 17 will then apply a weight signal to the multiplier, averaging and adjustment circuit 15 corresponding to the net weight of the reference 25. Or, in an alternate embodiment, a test weight reference voltage source 26 may be used for supplying a voltage corresponding to the output of the scale 16 when the predetermined reference weight 25 is on the scale 16. A switch 27 is shown for selectively disconnecting the scale 16 and connecting the test weight reference voltage source 26 to the amplifier 17 for applying a simulated weight signal to the multiplier, averaging and adjustment circuit 15 during calibration.

The values of the reference weight and the simulated conveyor speed are selected to give a desired calibration weight transfer rate. This rate is compared with the transfer rate indicated on the digital weight transfer rate readout 19. In the event of a deviation between these transfer rates, the conveyor scale 10 is adjusted by means of zero and span adjustments in the amplifier, averaging and adjustment circuit 17 and the multiplier 15 to eliminate such deviation. Calibrating circuitry for making such adjustments is shown in the referenced U.S. Pat. No. 3,754,126. After the weight transfer readout 19 is calibrated, the total weight readout 22 also may be calibrated, if necessary. However, this is generally a factory adjustment and field adjustment is not needed. Given the known transfer rate under the test calibration conditions, the total weight transferred over a period of time will also be known. The conveyor scale 10 is operated for a predetermined time interval under the test calibration conditions. This time interval times the measured transfer rate will indicate a total weight transfer during that time interval which is compared with the weight shown on the readout 22. The predetermined time interval may be manually measured or a time controlled switch may be connected to limit the accumulation of a total weight in the counter 21 for the time interval. For example, a timer 23 is shown connected for inhibiting the counter 21 after a measured predetermined time interval. If there should be any deviation between the two weights, either the analog-to-digital converter 18 or the voltage-to-frequency converter 20 may then be corrected such that the total weight readout 22 indicates a reading consistent with the indicated weight transfer rate.

After the conveyor scale 10 is test calibrated, the accuracy of the calibration is checked with a "live" material run by conveying a measured quantity of material. After this material has been conveyed and weighed, the displayed total weight on the readout 22 is compared with the known weight for the material. In the event of a deviation between these weights, a correction factor in the form of a percentage error is determined. The conveyor scale 10 is then returned to its test condition wherein the switches 24 and 27 are positioned to supply signals for simulating a predetermined speed of the conveyor 11 and a predetermined weight on the scale 16. A span circuit within the amplifier and adjustment circuit 17 is then adjusted, using the calibration factor, to make a percentage change in the weight transfer rate indicated on the readout 19 for eliminating any error remaining in the output of the conveyor scale 10. This completes calibration of the conveyor scale 10 without the need of multiple or repeated measurements of large quantities of a previously measured material. By calibrating with the span adjustments and using simulated weights and conveyor motion, there is an instant feedback whenever an adjustment is made. Such a feature has not been available in the prior art methods and apparatus for calibrating conveyor scales.

The calibration method may be more readily understood from the following example. For this example, it will be assumed that the tachometer 13 produces 10 pulses or 10 cycles for each lineal foot movement of the conveyor belt 11. It will also be assumed that the active length or the weight span for the scale 16 is 2 feet in the direction in which the conveyor belt 11 moves. Finally, it will be assumed that the conveyor belt 11 is capable of operating in a maximum capacity of 500 feet per minute carrying a total transfer weight of 1,000 pounds per minute. Given these operating conditions, the tachometer 13 will emit a signal at 5000 pulses or cycles per minute at full capacity since the conveyor is moving at 500 feet per minute and the tachometer 13 produces 10 pulses for each lineal foot movement of the conveyor belt 11. However, during calibration, the conveyor belt 11 is not moving. Therefore, the reference clock 23 applies a signal at the rate of 5000 pulses per minute through the switch 24 to the multiplier and averaging circuit 15 to simulate movement of the conveyor belt 11. For a conveyor belt speed of 500 feet per minute and a transfer weight of 1,000 pounds per minute, it is readily apparent that 2 pounds of material will be present on each lineal foot of the conveyor at full capacity. Since the active length of the scale 16 has been assumed to be 2 feet long, 4 pounds of material will then be present within the weight span of the scale 16. During calibration, either a 4 pound reference weight 25 may be placed on the conveyor belt 11 over the scale 16 or, the test weight reference voltage source 26 may be connected through the switch 27 to the amplifier 17 for providing a signal corresponding to the output of the scale 16 when a 4 pound weight is present on the scale 16.

During test calibration, the conveyor scale 10 is then permitted to compute and display a digital weight transfer rate on the readout 19. If there should be any deviation between the calibration rate of 1000 pounds per minute and the displayed rate, the conveyor scale 10 is then calibrated such that the readout 19 indicates a correct transfer rate of 1000 pounds per minute. This calibration is generally made with a span control in either the amplifier 17 or the multiplier 15. If the conveyor scale 10 is operated for a precise time interval such as 10 minutes, the total weight readout 22 should indicate that a precise weight, e.g., 10,000 pounds, of material have been transferred. If there should be any deviation in the indicated readout, the converter 20 is adjusted to eliminate the error. For example, if the digital readout 22 should show that only 8000 pounds were transferred during the 10 minute interval instead of 10,000 pounds, there should be a 25% increase in the indicated weight for obtaining a correct reading. The converter 20 is then adjusted to give a 25% higher output. After the conveyor scale 10 is test calibrated, a live test is made by conveying and measuring a known quantity of material on the conveyor belt 11. After the known quantity of material is conveyed, the known weight is compared with the measured weight as indicated on the readout 22. The percentage deviation between the known and measured weights is used as a calibration factor for adjusting the conveyor scale 10 to a high degree of accuracy. The final adjustments are made by again using either the test weight 25 or the test weight reference voltage source 26 and the reference clock 23 for simulating a predetermined weight transfer rate. Using the calibration factor, span adjustments within the amplifier 17 or the multiplier 15 are adjusted to make a percentage change in the weight transfer rate indicated on the readout 19. After these adjustments are made, calibration of the conveyor scale 10 is complete. It is not necessary to make additional runs with live material and additional adjustments for obtaining a high degree of accuracy in the output of the conveyor scale 10.

From the foregoing description, it will be appreciated that the apparatus and method of the present invention may be adapted to any prior art electronic conveyor scale. For example, the material conveyor may be of any conventional type and is not limited to a belt conveyor. Furthermore, the conveyor scale may use various methods for arriving at the transfer rate or the total transfer weight from either an analog or a digital electric signal corresponding to the weight on a segment or within a region of the conveyor and a second electric signal corresponding to the conveyor speed. Various other modifications and changes may be made without departing from the spirit and the scope of the claimed invention.

What we claim is:

1. Measuring apparatus for use with a conveyor for moving material through a region comprising, in combination, means for generating an electric speed signal corresponding to the speed of the conveyor, means for generating an electric weight signal corresponding to the weight of material in the region, multiplying means responsive to said speed and weight signals for generating an electric signal which is a measure of the weight transfer rate, and means for calibrating said measuring apparatus, said calibrating means including means for applying to said multiplying means a weight signal corresponding to a predetermined weight, means for generating an electric signal for simulating said speed signal at a predetermined constant conveyor speed, switch means for selectively applying said simulated speed signal to said multiplying means in place of said conveyor speed signal whereby said weight transfer rate signal is generated in response to said simulated speed signal and said predetermined weight signal, and means for adjusting said measuring apparatus to eliminate any deviation in said weight transfer rate signal from a true weight transfer rate signal for such predetermined constant conveyor speed and predetermined weight in the region.

2. Measuring apparatus for use with a conveyor for moving material through a region, as set forth in claim 1, wherein said means for applying to said multiplying means a weight signal corresponding to a predetermined weight includes means for generating a signal for simulating said predetermined weight in the region, and second switch means for selectively applying said simulated weight signal to said multiplying means in place of said weight signal.

3. Measuring apparatus for use with a conveyor for moving material through a region, as set forth in claim 1, and further including integrating means responsive to said weight transfer rate signal over a period of time for generating a signal corresponding to the total weight of material transferred through the region during such period of time.

4. Measuring apparatus for use with a conveyor for moving material through a region, as set forth in claim 3, and wherein said means for calibrating said measuring apparatus further includes means for measuring a time interval during which said simulated speed signal and said predetermined weight signal are applied to said multiplying means, and means for adjusting said measuring apparatus to eliminate any deviation in said total weight signal from a true total weight signal for such predetermined conveyor speed and predetermined weight.

5. Measuring apparatus for use with a conveyor for moving material through a region, as set forth in claim 4, wherein said means for applying to said multiplying means a weight signal corresponding to a predetermined weight includes means for generating a signal for simulating said predetermined weight in the region, and second switch means for selectively applying said simulated weight signal to said multiplying means in place of said weight signal.

6. Measuring apparatus for use with a conveyor for moving material through a region comprising, in combination, means for generating an electric speed signal corresponding to the speed of the conveyor, means for generating an electric weight signal corresponding to the weight of material in the region, means responsive to said speed and weight signals over a predetermined period of time for generating an electric signal which is a measure of the total weight of material transferred through the region during said period of time, and means for calibrating said measuring apparatus, said calibrating means including means for applying to said total weight signal generating means a weight signal corresponding to a predetermined weight, means for generating an electric signal for simulating said speed signal at a predetermined constant conveyor speed, switch means for selectively applying said simulated speed signal to said total weight signal generating means in place of said conveyor speed signal whereby said total weight signal is generated in response to said simulated speed signal and said predetermined weight signal, and means for adjusting said measuring apparatus to eliminate any deviation in said total weight signal from a true total weight signal for such predetermined conveyor speed and predetermined weight over said period of time.

7. Measuring apparatus for use with a conveyor for moving material through a region, as set forth in claim 6, wherein said means for applying to said total weight signal generating means a weight signal corresponding to a predetermined weight includes means for generating a signal for simulating said predetermined weight in the region, and second switch means for selectively applying said simulated weight signal to said total weight signal generating means in place of said weight signal.

8. A method for calibrating a conveyor scale which measures material transferred through a region by a conveyor, said scale having means for generating a signal corresponding to the speed of the conveyor, means for generating a signal corresponding to the material weight within the region, and multiplying means responsive to said conveyor speed signal and said material weight signal for generating a signal corresponding to the material transfer rate, said method comprising the steps of: generating an electric signal for simulating a predetermined conveyor speed, applying said simulated speed signal to said multiplying means, applying a signal to said multiplying means corresponding to a predetermined material weight in the region, and adjusting said conveyor scale to generate a transfer rate signal corresponding to a true transfer rate signal for the simulated conveyor speed and the predetermined material weight within the region.

9. A method for calibrating a conveyor scale, as set forth in claim 8, wherein said predetermiined material weight signal is applied to said multiplying means by placing a test weight corresponding to said predetermined weight on said weight signal generating means while said conveyor is stopped.

10. A method for calibrating a conveyor scale, as set forth in claim 8, including the step of generating a signal to simulate said predetermined weight in the region and wherein said predetermined material weight signal applied to said multiplying means is the simulated predetermined weight signal.

11. A method for calibrating a conveyor scale which measures material transferred through a region by a conveyor, said scale having means for generating a signal corresponding to the speed of the conveyor, means for generating a signal corresponding to the material weight within the region, and means responsive to said conveyor speed signal and said material weight signal over a period of time for generating a signal corresponding to the total weight of material transferred during such period of time, said method comprising the steps of: generating an electric signal for simulating a predetermined conveyor speed, simultaneously applying to said total weight signal generating means said simulated speed signal and a signal corresponding to a predetermined material weight in the region for a measured period of time, and adjusting said conveyor scale to generate a total weight signal after such period of time corresponding to a true total weight signal for the simulated conveyor speed and the predetermined material weight within the region during the period of time.

12. A method for calibrating a conveyor scale, as set forth in claim 11, wherein said predetermined material weight signal is applied to said total weight signal generating means by placing a test weight corresponding to said predetermined weight on said weight signal generating means while said conveyor is stopped.

13. A method for calibrating a conveyor scale, as set forth in claim 11, including the step of generating a signal to simulate said predetermined weight in the region and wherein said predetermined material weight signal applied to said total weight signal generating means is the simulated predetermined weight signal.

* * * * *